June 11, 1940.  W. T. MOORE ET AL  2,204,144
FLUID HEAT EXCHANGE APPARATUS
Filed Oct. 31, 1935  8 Sheets-Sheet 5
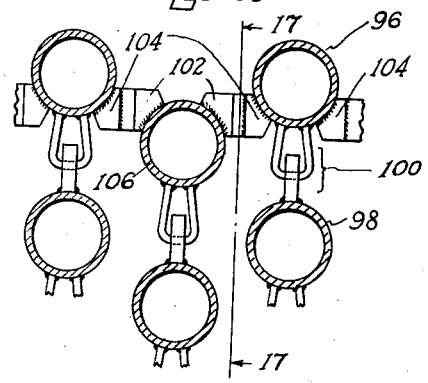
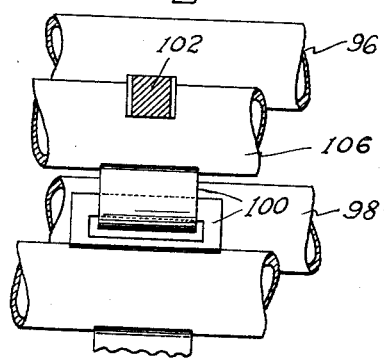
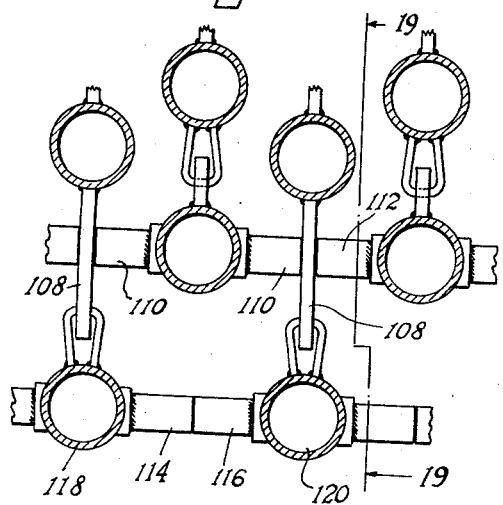
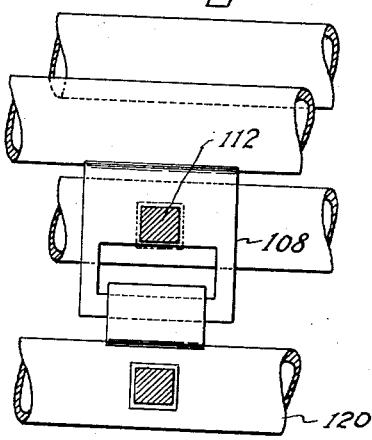
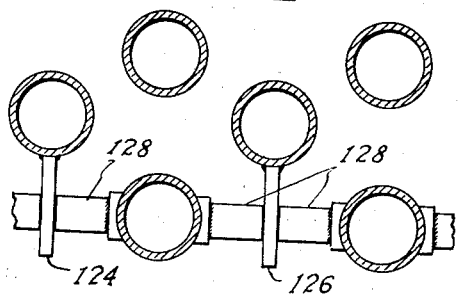
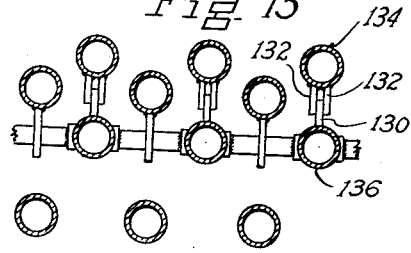
INVENTORS
William T. Moore, Perry R. Cassidy,
Ralph M. Hardgrove & Howard J. Kerr.
BY
ATTORNEY

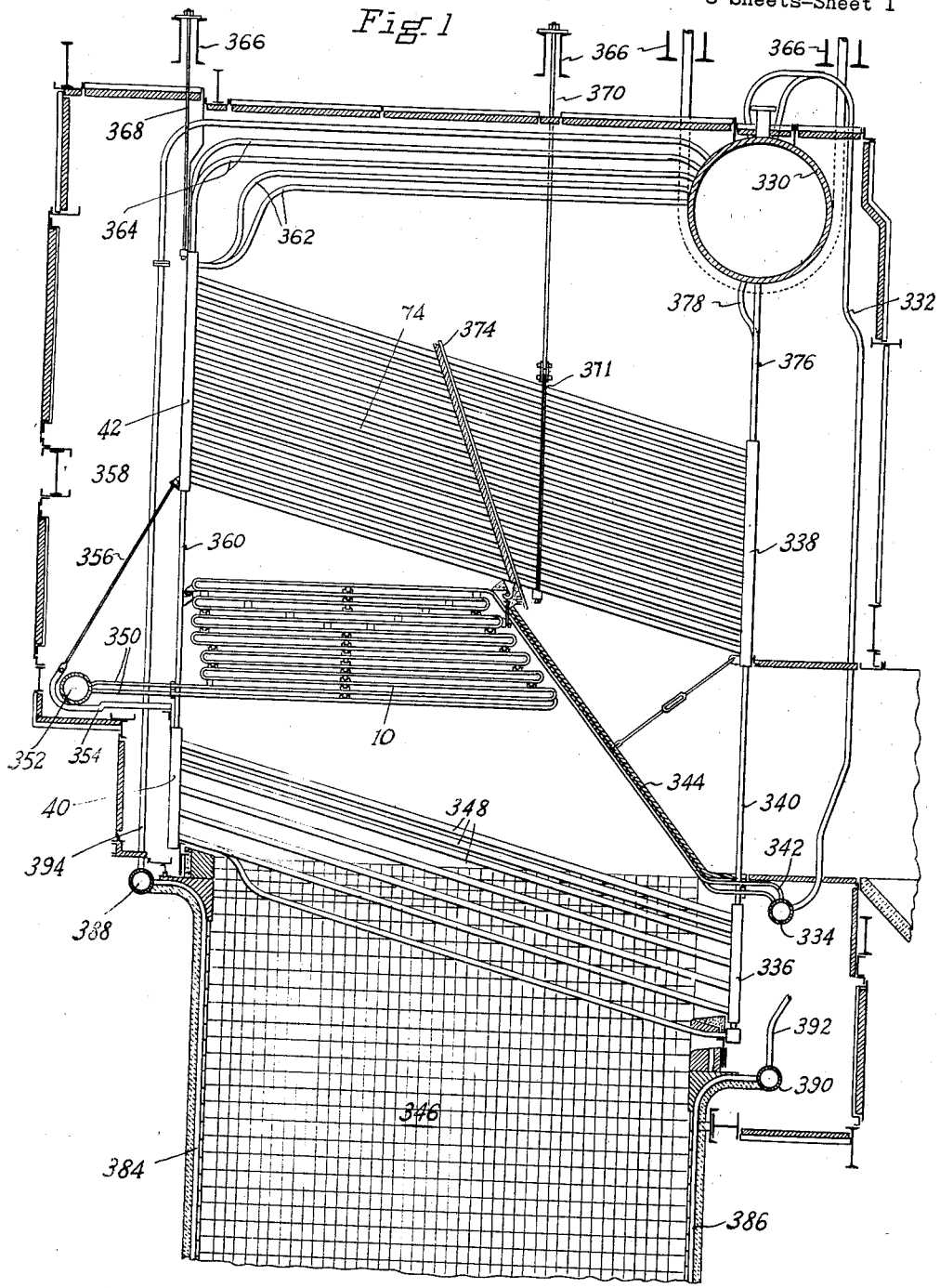

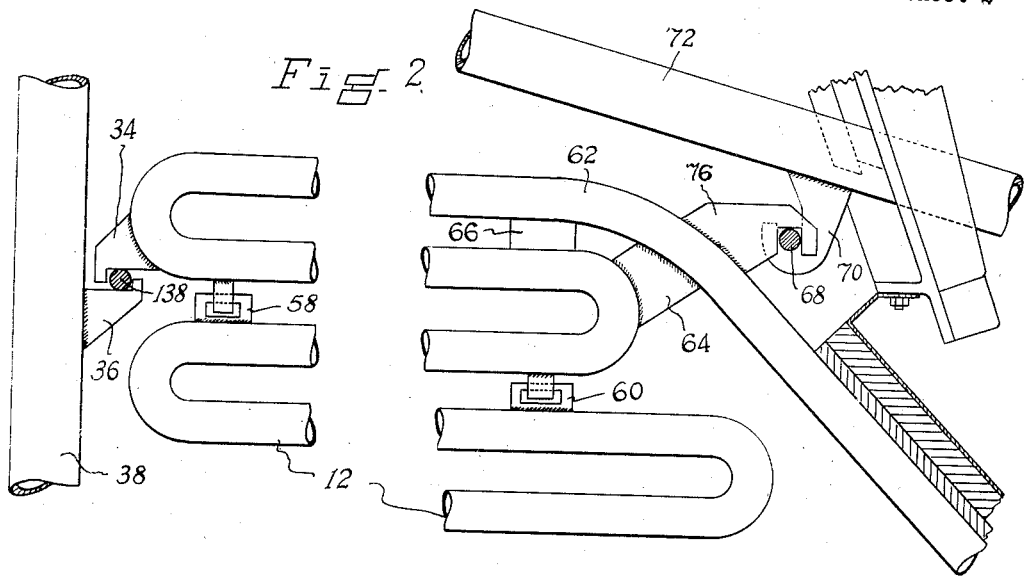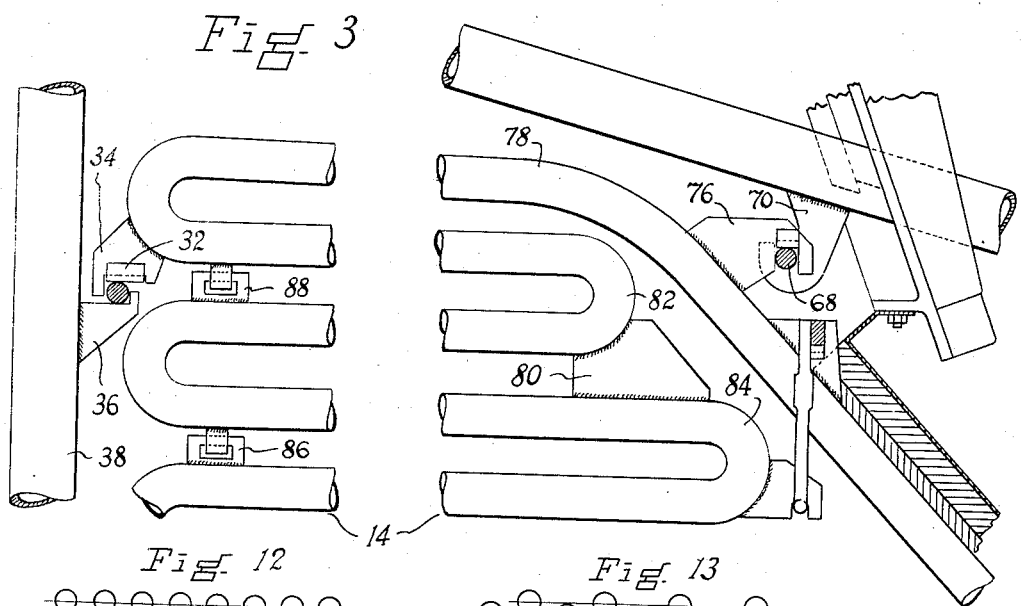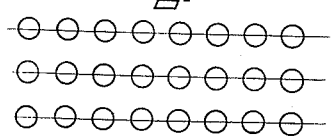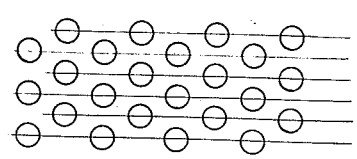

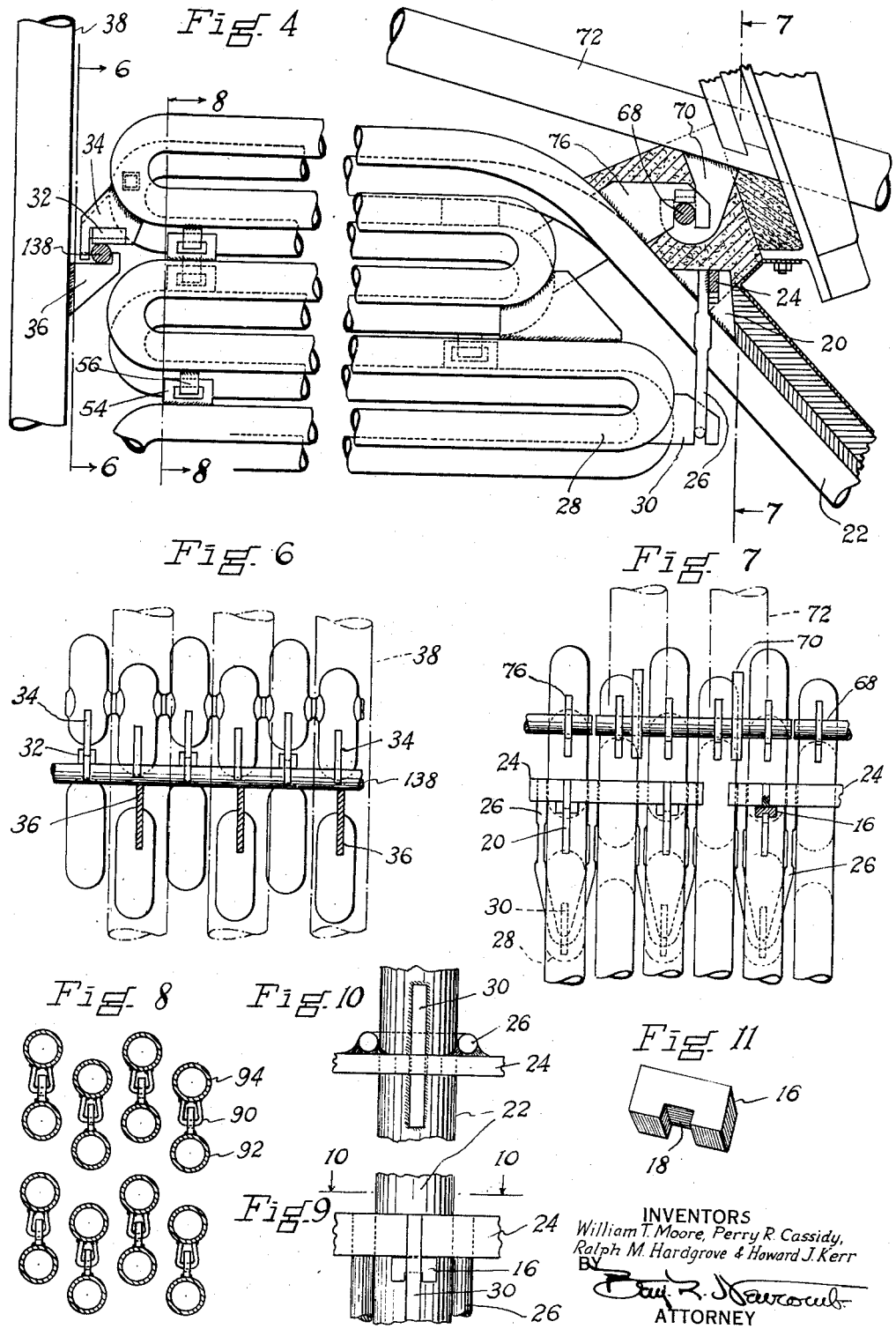

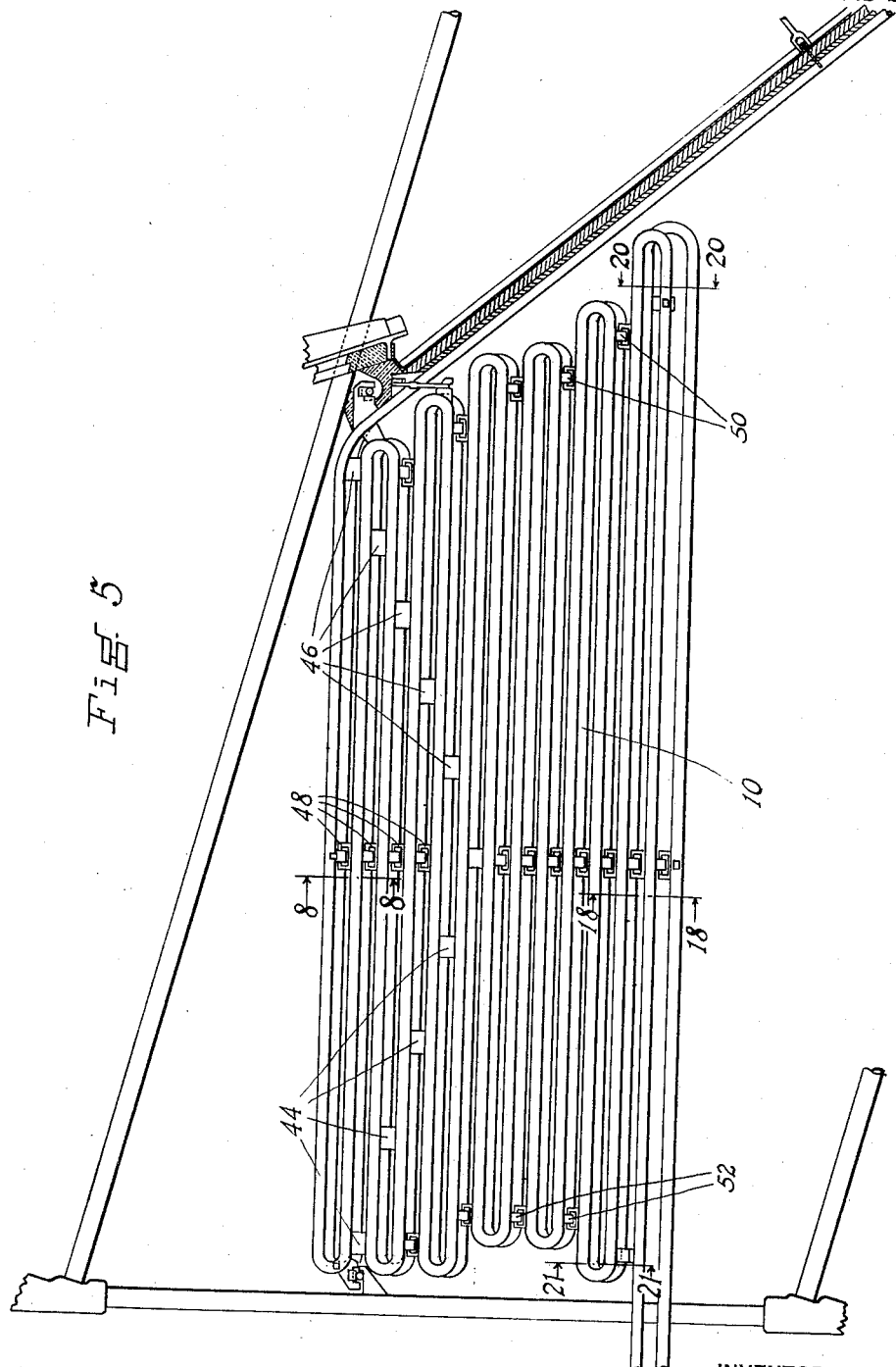

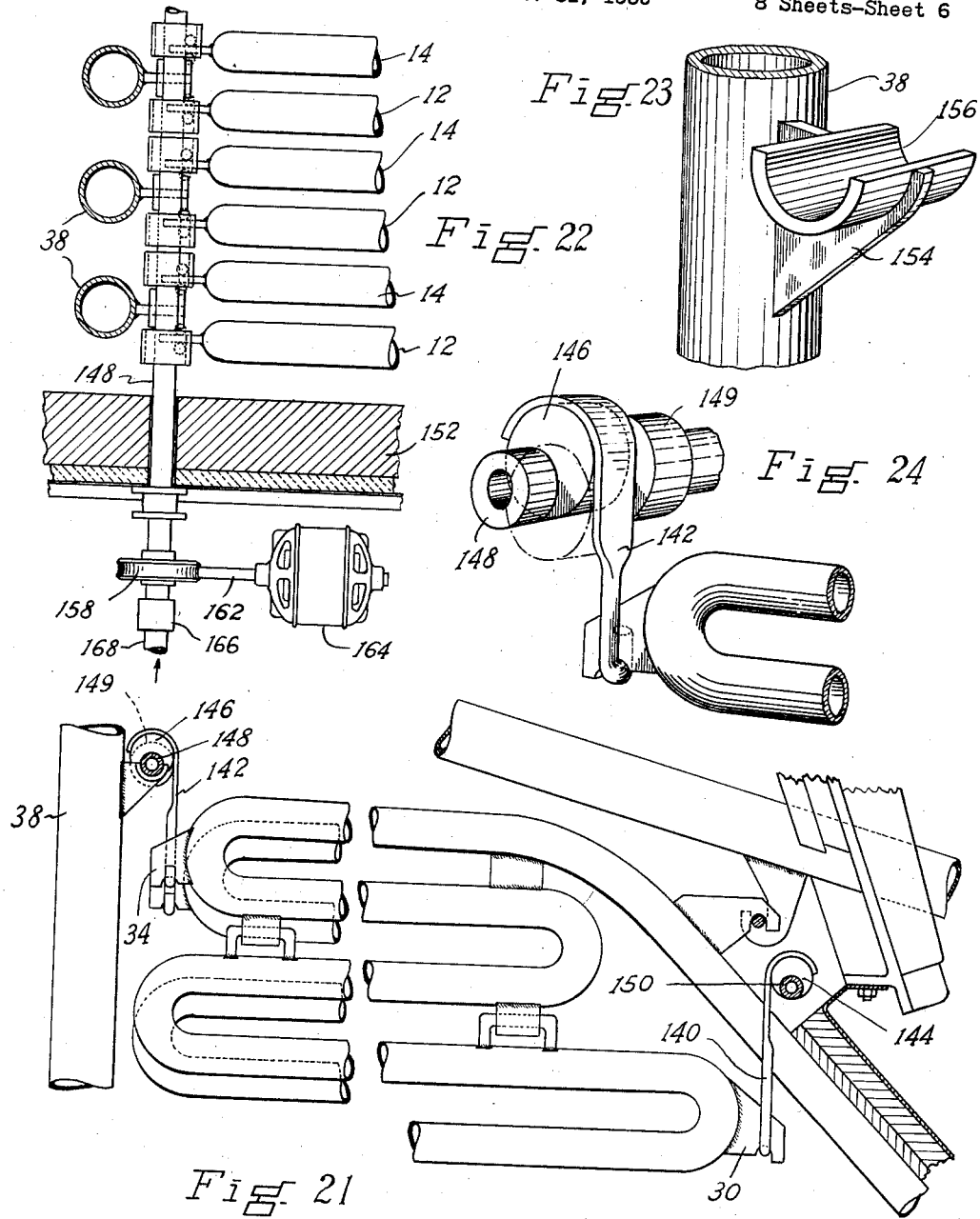

June 11, 1940.  W. T. MOORE ET AL  2,204,144
FLUID HEAT EXCHANGE APPARATUS
Filed Oct. 31, 1935  8 Sheets-Sheet 7
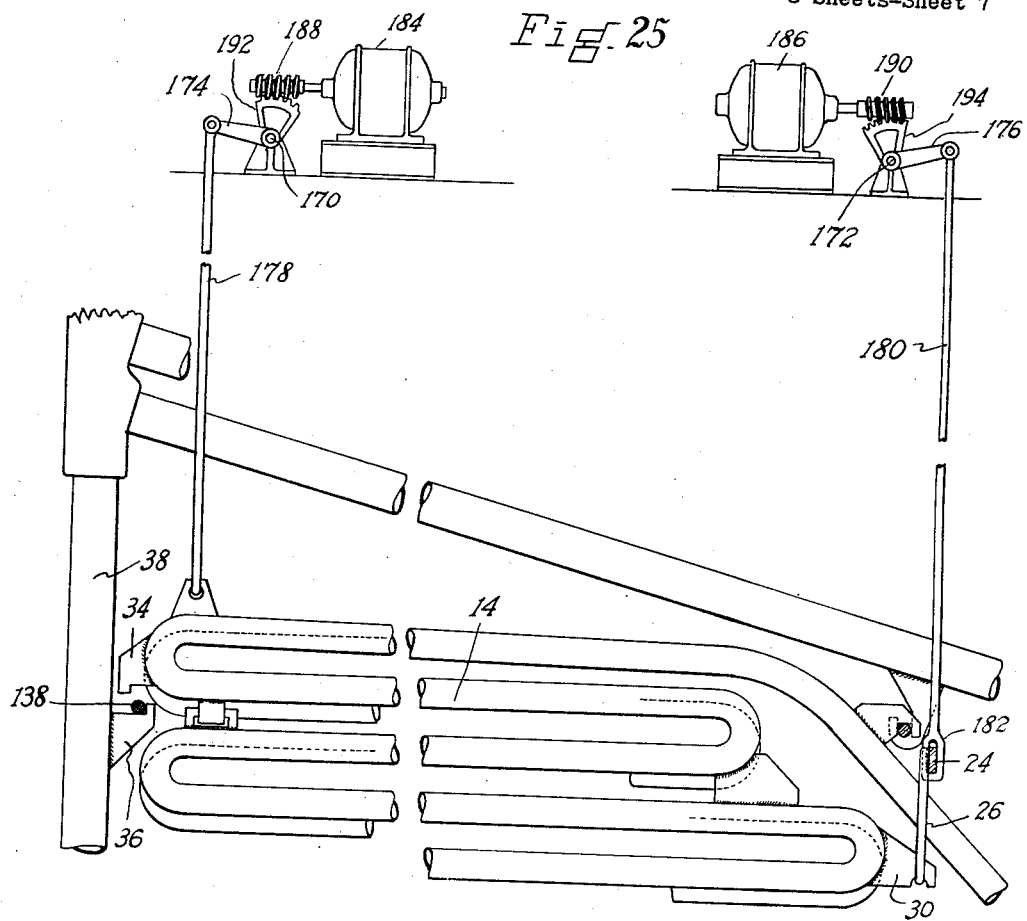
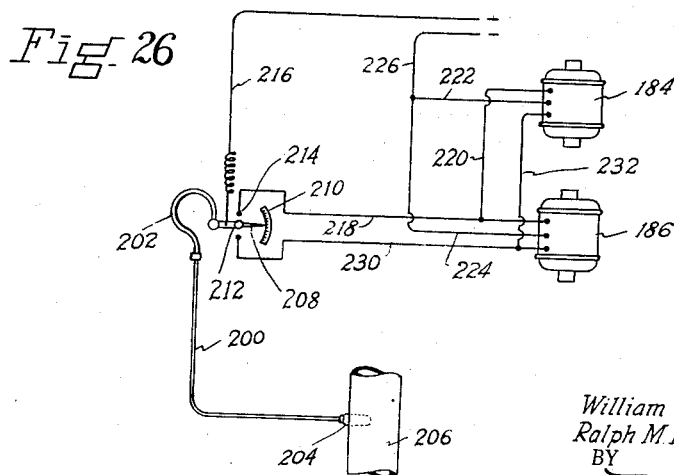
INVENTORS
William T. Moore, Perry R. Cassidy,
Ralph M. Hardgrove, & Howard J. Kerr.
BY
ATTORNEY.

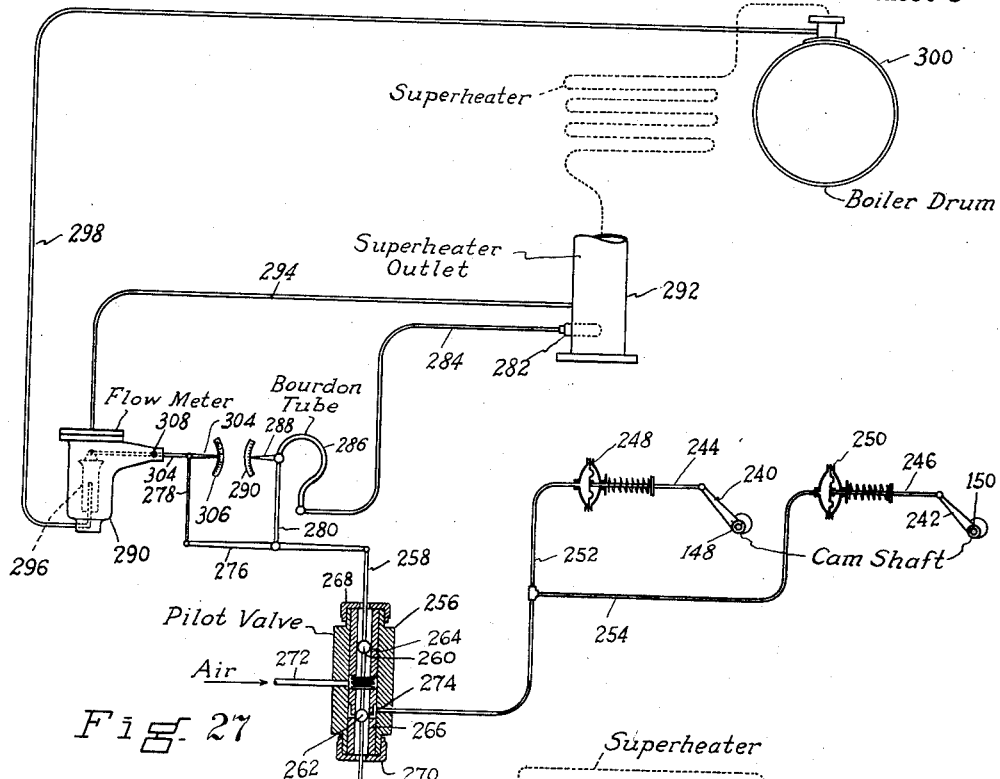
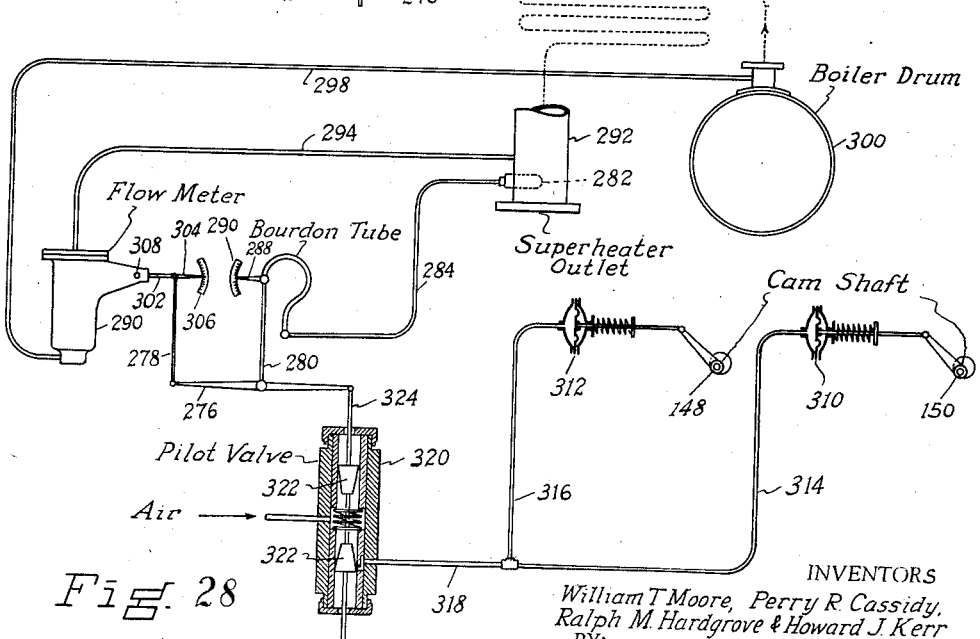

Patented June 11, 1940

2,204,144

UNITED STATES PATENT OFFICE

2,204,144

FLUID HEAT EXCHANGE APPARATUS

William T. Moore, New York, N. Y., and Perry R. Cassidy, Short Hills, and Ralph M. Hardgrove and Howard J. Kerr, Westfield, N. J., assignors to The Babcock & Wilcox Company, Newark, N. J., a corporation of New Jersey Application October 31, 1935, Serial No. 47,528

6 Claims. (Cl. 122—479)

This invention relates to fluid heat exchange apparatus, and more particularly to means for controlling the heat exchange effected by such apparatus.

More particularly, this invention relates to improvements in tubular heat exchangers whereby their heat transfer may be effectively controlled over a wide range of operating conditions.

The heat transfer rate between a fluid and a tube bank swept by it transversely, depends on the mass flow, or velocity of the fluid between the tubes of the bank at a given fluid density, and especially on the highest velocity between adjacent tubes.

The rate of heat transfer by convection from a hot gas stream to a colder body, such as a tube, is a function of the velocity and density of the gas in heat transfer proximity to the tube. This relation of velocity of heating medium is referred to as mass flow to include density and, an increase in the mass flow is effective in raising the rate of transfer, other conditions being equal.

In many cases of convection heat exchange between tubes of a bank and a transversely flowing fluid, it is important that the rate of heat transfer be capable of variation for a given total fluid flow in pounds per hour and given temperature difference between the gas and the tube. The object may be to change the exit temperature of a fluid flowing within the tubes, or to maintain the same temperature with a different flow rate of the inside fluid with a constant rate of flow of the external fluid.

It may also be the object of such control to maintain exit temperatures of the inside fluid at an unchanged flow rate of its own, when the flow rate or temperature of the external fluid has changed. Another object is to control metal temperature itself.

An example of conditions under which it is desirable that the exit conditions of an inside fluid be changed for a given state of the external fluid, is found in a superheater of a boiler, especially a superheater so arranged in the boiler setting that its tubes are transversely swept by gases from the boiler furnace. Here, the temperature of the exit steam, or its superheat, is an important factor in the operation of a steam power plant and the temperature of the tube itself is an important factor. The heating conditions of the gases may at certain times be such that the superheat is higher or lower than that desired. This is a condition which should be corrected.

A change in the exit condition of the internal fluid may be secured by changing the flow areas between adjacent tubes so as to change the velocity of the external and transversely flowing fluid, and this change may be a change in the mean velocity, or merely a change in the maximum velocity without changing the mean velocity.

The principles and apparatus as hereafter described are particularly advantageous in connection with boiler superheaters where the control of the superheat temperatures with the boiler operating over a wide range of load is highly desirable.

In a steam boiler having a superheater incorporated in it, steam demand or output is the factor which determines the rate at which fuel is burned, and thereby the quantity of hot gases available for superheating of steam and the temperature of those gases. For a given location in a boiler setting the steam superheating effect of the gases over a certain range of boiler output, or load, is not always in accordance with that desired, and by our invention, a variation of the degree of superheat is secured by effecting a change in the rate of heat transfer through a change in the gas mass flow, simultaneously retaining the same heat transfer surface area at any boiler load.

The present invention, which embodies devices for affecting and controlling fluid heat exchange in the manner specified, will be described with reference to the accompanying drawings, in which:

Fig. 1 is a vertical section through part of a steam generating installation, showing a superheater which may be constructed in accord with the teachings of this invention.

Fig. 2 is a detail view in the nature of a side elevation of a part of one of the superheater coils.

Fig. 3 is a detail view in the nature of a side elevation of one of the superheater coils which are interposed relative to the coils set forth in Fig. 2.

Fig. 4 is a detail view in the nature of a side elevation, showing the Fig. 2 coil in its relation to an adjacent Fig. 3 coil.

Fig. 5 is a view of the entire superheater in side elevation.

Fig. 6 is an end view of several of the superheater coils, taken along the line 6—6 of Fig. 4 and looking in the direction of the arrows.

Fig. 7 is an end elevation of part of the superheater structure taken at the position indicated by the line 7—7 of Fig. 4 and looking in the direction of the arrows.

Fig. 8 is a detail showing the arrangement and relationship of the tubes of the superheater.

Fig. 9 is a partial end elevation of a part of the superheater structure, taken from such a position as that indicated by the line 7—7 of Fig. 4 and looking in the direction of the arrows.

Fig. 10 is a plan view of the structure indicated in Fig. 9.

Fig. 11 is a perspective view of an adjustment element which is indicated in Fig. 9.

Figs. 12, 13 and 14 are diagrammatic views indicating different arrangements of the tubes under different adjustments of the superheater.

Fig. 15 is a partial section of a superheater tube bank showing means for maintaining different tube sections in the desired relationships.

Fig. 16 is a partial vertical section of a superheater tube bank showing slip hangers between tube sections in the upright rows and other devices for maintaining the superheater coils in the desired horizontal spacing.

Fig. 17 is a partial side elevation taken on the line 17—17 of Fig. 16 and looking in the direction of the arrows.

Fig. 18 is a partial vertical section through a modified superheater tube bank showing a different arrangement of the slip hangers and the tube spacing devices.

Fig. 19 is a partial horizontal section taken on the line 19—19 of Fig. 18, and looking in the direction of the arrows.

Fig. 20 is a partial vertical section of an additional embodiment of the devices for maintaining the superheater tubes in predetermined relationships.

Fig. 21 is a view showing mainly in elevation an embodiment whereby the superheat may be controlled by changing the gas mass flow while the superheater is in operation.

Fig. 22 is a view in the nature of a plan, showing one of the cam shafts for adjusting the movable superheater coils.

Fig. 23 is a perspective view showing the manner in which the bearings for one of the cam shafts are constructed.

Fig. 24 is a perspective view showing the manner in which the ends of the movable superheater coils are supported and moved by one of the cam shafts.

Fig. 25 indicates in side elevation an embodiment wherein reversible electric motors may be used in the automatic control of superheat.

Fig. 26 indicates diagrammatically an automatic superheat control responsive to temperature in the superheater outlet.

Fig. 27 is a diagrammatic view of control apparatus whereby the cam shafts of the Fig. 21 embodiment are moved in response to changes in steam flow as affected by superheat variations.

Fig. 28 indicates diagrammatically a control system whereby the cam shafts of the Fig. 21 embodiment may be sequentially controlled with reference to superheat and steam flow.

The superheater tube bank which is indicated as an entity by the numeral 10 in Figs. 1 and 5 is made up of rows of horizontal tubes which are shown as arranged in different vertical planes so as to constitute a series of vertical flat coils. In the illustrative embodiment there is a multiplicity of these flat coils arranged side by side alternately in two sets. Alternate coils, such as the coil 12 indicated in Fig. 2, are stationary. The intervening coils, such as the coil 14 indicated in Fig. 25 of the drawings are movable. They are adjustably fixed vertically, but each is held in a certain vertical plane. Accordingly, the top tubes of all of the coils may be positioned in one horizontal plane, or alternate tubes may be in a plane different from that of the intervening tubes. When all of the top tubes are in one plane the spaces between the tubes are at a minimum value, and when alternate tubes are in different planes the spaces between the tubes are greater. The spaces are at a maximum when the lower of the two planes is midway between the planes of the first and second row of tubes of the fixed coils 12. With this arrangement, the exit temperature of the steam or other fluid inside the tubes can be varied for any given condition of the outside fluid by raising or lowering the coils 14 to a degree limited by one-half the space between two adjacent tubes in a fixed coil 12.

It is within the purview of the invention that all of the movable coils may be connected to some control mechanism which will cause them to be simultaneously moved, or connected to a mechanism which will cause any selected number of the movable coils to be located in different desired positions. Also the movement of such control mechanism may take place during the operation of the superheater, or between operating periods when the unit is shut down. Finally, the movement of the superheater coils may be manually controlled or automatically controlled so as to respond automatically to changes in the exit temperature of the steam, or to change in steam flow.

In practice, both the fixed coils and the movable coils are connected to the same inlet and outlet headers, and it is, therefore, important that the movable coils possess such flexibility as will permit the vertical adjustment described. In the illustrative constructions this flexibility is provided. In one embodiment the movement of the alternate coils vertically is manually made and is of the adjustably fixed type, in the sense that their position is set when the superheater is out of operation. This setting or positioning is determined by the use of interlocking elements of different thickness. One of these elements 16 is shown in perspective in Fig. 11 of the drawings. It is formed with a recess 18 which receives a part of a lug 20 welded to the inclined superheater inlet tube 22. It is shown in operative position in Fig. 9 of the drawings, where it is positioned beneath a transverse end support 24 for a group of the adjustable coils. This type of vertical adjustment may be applied to one end only of each of the vertically adjustable coils, or to both ends.

Tension members 26 may have their upper ends secured to the support 24 by welding, and the lower ends of these members may be bent or looped to support the U bends 28 of the superheater coils. As shown in Fig. 4 the lug 30, fixed with reference to a U bend 28, is notched to receive the lower end of the tension member 26. When it is desired to change the vertical position of one of the coils 14, a shim 16 may be removed and a shim of different height inserted in its place. A corresponding change may be made at the opposite ends of the coil 14 by the removal of shims 32 which are interposed between the lugs 34 and the brackets 36. The latter are shown as welded to upright tubes 38 or nipples connecting the headers 40 and 42.

The illustrative superheater is designed to give the predetermined superheat when the adjustable coils are at a given height. If the operating conditions are changed so that the superheat is too high or too low, the unit may be shut down and the adjustable coils are raised or lowered to change the smallest space between the tubes and adjacent vertical coils and hence the maximum velocity or mass flow.

The superheater as shown is carried by top supports at both ends, and by inter-tube supports of different kinds for the successive tube sections at the lower levels. Referring particularly to Fig. 5 of the drawings, the connectors 44 and 46 are metallic struts interposed between successive tube sections and welded thereto at the top and bottom. Centrally of the superheater there are several connectors which are illustrated as the slip hangers 48. Similar slip hangers 50 and 52 are illustrated at the ends of the superheater. These devices may be in the form of tube loops illustrated more clearly in Fig. 4 of the drawings. Here, a lower loop 54 is welded at the top of a lower tube section and an upper loop 56 extends through the lower loop with its ends welded to a tube section directly above. This arrangement permits relative longitudinal expansion movements of adjacent tubes and permits some flexibility in the adjustment of the superheater coils.

When the fixed superheater coils are constructed in accordance with the disclosure of Fig. 2 of the drawings certain slip hangers 58 and 60 are provided at the ends of the superheater, and the uppermost superheater tube 62 is rigidly connected with the next lower superheater tube by struts 64 and 66 which are welded to the tubes. A hook member 76 is welded to the top of the tube 62 and is positioned so as to receive a bar 68 held in horizontal position by successive depending hook members 70 welded at their upper ends to steam generating tubes 72 of the upper bank 74.

As shown particularly in Fig. 3 of the drawings, the adjustable or movable superheater coils are supported by hook members 76 engaging the rod 68. These coils, however, do not have the rigid inter-tube struts connecting their uppermost tubes 78 with the next lower tubes. There may be, however, a rigid inter-tube strut 80 between the second and third U bends 82 and 84 respectively. At the other end of the superheater there are located the slip hangers 86 and 88. This arrangement gives the coils the necessary flexibility to permit the adjustment which controls the operation of the superheater.

Figs. 8, 16 and 18 indicate different arrangements of the superheater tubes and devices for maintaining the tubes in their lateral spaced arrangement while permitting vertical adjustment of alternate tubes. In the Fig. 8 construction the slip hangers 90 support the lower tubes 92 from upper tubes 94 and permit relative movement between the tubes when they are subject to different temperature conditions.

In the Fig. 16 construction the tubes in successive superheater coils are staggered with relation to each other, and successive tube sections 96 and 98 in the same coil are connected by the slip hangers 100. The coils are held in the desired horizontal spacing by means of bar extensions 102 and 104. The former are shown as secured in pairs to the top tube 106 of an intermediate superheater coil. Their outer surfaces preferably extend in vertical planes where these studs contact with similar surfaces of the studs 104. With this construction, the alternate coils may be shifted vertically by a control mechanism while the horizontal spacing of the coils is maintained.

In the Fig. 18 construction the parts 108 of some of the slip hangers are of increased length. This gives a wider spacing of the tubes in the lower two rows and allows the superheater coils to be held in their desired horizontal spacing by studs 110 and 112 which bear against the parts 108. Studs 114 and 116 secured respectively to the lower tubes 118 and 120 may be in direct contact as shown.

Fig. 20 shows the downwardly extending plates or studs 124 and 126 which are contacted by horizontal studs 128 welded to the tubes of the middle row. The superheater coils are thereby maintained in the desired horizontal spacing. A similar arrangement of elements is shown in Fig. 15 which also illustrates the upwardly extending studs 130 as slidable between the spaced elements 132 depending from the tubes 134, located directly above the tubes 136.

Movement of the superheater coils, under the influence of temperature expansion and contraction is prevented from causing excessive distortion by the arrangement of the rods or rollers 138 in guideways provided by the companion brackets 34 and 36, but when the coils are suspended as shown in Figs. 21 and 25 no such rollers are necessary. In Fig. 21, the movable superheater coils are held by hooks 140 and 142, suspended from the eccentric portions 144 and 146 of the tubular fluid cooled cam shafts 148 and 150. Each strap preferably has its upper end curved as clearly indicated in Fig. 24 of the drawings so as to fit closely over one of the eccentric portions 146.

As indicated in Fig. 22 of the drawings the cam shaft 148 extends through the wall 152 of the furnace and is rotatably mounted in bearings which are rigid with the nipples 38. As shown in Fig. 23 each bearing is in the nature of a metallic stud preferably welded to the nipple and cooled by reason of the fluid circulation. Each bearing consists of the bracket 154 and shaft support 156.

The fixed superheater coils 12 (Fig. 22) may be supported by straps similar to straps 140 and 142 the upper ends of which rest upon circular parts 149 concentrically fixed to the cam shafts. By reason of such an arrangement of elements these coils always remain in the same vertical positions when a superheat control mechanism involves turning of the cam shafts and consequent change in the mass flow over the superheater.

When a fixed coil 12 and a movable coil 14 are arranged on opposite sides of a shaft support 156 (as indicated in Fig. 22) the elements 149 and 146 may contact with opposite ends of the support to prevent endwise movement of the shaft. The worm gear 158 will also be thereby prevented from moving out of its operative position relative to the worm on the shaft 162 of the reversible electric motor 164.

Beyond the gear 158 the hollow cam shaft is connected by a stuffing box 166 with a tubular element 168. Similar connections at the opposite ends of both of the cam shafts permits the circulation of a cooling fluid through the shafts for the purposes of protection against over-heating. Similarly, motors similar to 164 may be provided for both cam shafts.

Even when the cams 146 are of uniform design and are uniformly positioned entirely across the bank of superheater tubes a wide range of control of superheat is effected when the cam shaft is turned slightly in response to departure of the superheat from a desired value, but when the cams have different throws and are mounted at different angles, a still wider range of control is possible. Also, laning of the gases in the particular boiler constructions may be corrected by graduating the angles at which the cams are mounted, or by positioning cams of different eccentricities, varying in a predetermined manner across the superheater.

In place of the cam shafts 148 and 150 the Fig. 25 embodiment includes rocker shafts 170 and 172 on which crank-arms 174 and 176 are non-rotatively mounted. Each crank-arm 174 is pivotally connected with a rod 178 which extends through the boiler casing to a pivotal connection with a movable superheater coil 14. The opposite ends of the coils 14 are raised or lowered by the rods 180 pivotally connected at their upper ends with the crank arms 176. Loops 182 formed at the lower ends of these rods may receive the bars 24 as shown, and, in this event, each rod 180 controls the movements of two coils 14 through the connecting members 24 and 26.

The rocker shafts 170 and 172 are operated by reversible electric motors 184 and 186, and, for this purpose, worms 188 and 190 are arranged to mesh with worm wheel sectors 192 and 194. It is to be understood, however, that these devices are merely illustrative of means which may be used to move the rocker shafts in response to boiler load changes. Other devices such as diaphragm operators or piston stroke amplifiers might be used in conjunction with such control systems as those shown in Figs. 26, 27 and 28.

In Fig. 26, the capillary tube 200 connects a Bourdon tube 202 to a tubular element 204 exposed to the superheated steam in the tube or header 206, forming a closed system for suitable pressure transmitting fluid. The Bourdon tube carries an indicator 208 operating across the face of an index 210 and carrying a contact 212. When the superheat exceeds a predetermined value, the contact 212 is moved to engage the line contact 214 and complete a circuit through the main 216, the indicator 212, the motor line 218, the branch line 220, the motors, the branches 222 and 224, and the main 226 to cause the motors to be turned simultaneously in such a direction that the superheater coils 14 are lowered to decrease mass flow and thereby bring the superheat back to the predetermined value. Thereupon the circuit is broken by movement of the indicator back to the neutral position.

When the superheat falls below the predetermined value opposite actions take place, and the motors 184 and 186 are operated in a reverse direction by reason of the closing of a circuit involving the indicator, the main 216, the motor line 230, the branch 232, the motors, the branches 222 and 224, and the main 226.

With the system indicated in Fig. 27, the degree of superheat produced by such a superheater as that shown in Fig. 21 may be controlled by changing the characteristics of gas mass flow, and such changes may be functions of steam flow as indicated by pressure drop changes across the superheater, and total steam temperature changes. To effect such control, the shafts 148 and 150 are connected by crank arms 240, and 242, to the diaphragm stems 244 and 246 of the fluid operated diaphragm motors 248 and 250. Operation of the latter takes place in accordance with pressure changes in the lines 252 and 254 which are connected to a pilot valve indicated generally at 256.

In the present instance the pilot valve is operable in response to changes in superheat as modified by steam flow variations. The valve may comprise a stem 258 upon which are fixed upper and lower cones or spheres 260 and 262 respectively. These elements are positioned in sleeves 264 and 266 which, with the caps 268 and 270, form a pilot valve casing from which there is a constant bleed of air at both ends. There is thus a fully balanced valve construction with a constant flow of air past the elements 260 and 262. The latter are thus centered and lubricated and the construction is practically frictionless. Air under pressure is supplied to the casing through the line 272.

In the pilot valve shown in the drawings, the lower ball 262 is located adjacent a thin outline port 274 which communicates with the operators 248 and 250 through the intermediacy of the lines 252 and 254. With this arrangement of elements employed in this type of valve, the loading pressure on the diaphragm operators may have any desired relation to the axial movement of the stem 258 and the elements 260 and 262. For instance, if the latter are cone shaped there will be a definite straight relationship between loading pressure and axial movement, or by making them cylindrical, or otherwise, known characteristics of the movable superheater elements 14 can be incorporated in such a way that the loading pressure will be established to other than a straight line relation, according to such characteristics, and superheat be accordingly controlled. Such a pilot valve construction forms the subject matter of a co-pending application filed by Clarence Johnson on May 27, 1933, Ser. No. 673,212.

By controlling the pilot valve from temperature and boiler rating (as indicated by steam flow, from pressure drop across the superheater) a hunting cycle is avoided. To accomplish this control a floating link or lever 276 is employed. As shown, this link is connected at one end to the pilot valve stem 258, and at its other end to a flow meter control link 278. At an intermediate position it is connected to the temperature control link 280.

The temperature control operative upon the floating link 276 includes a gas filled temperature responsive system having a bulb 282 in the steam line or the superheater outlet header as indicated in Fig. 27. This bulb is connected by a small capillary tube 284 to a Bourdon tube 286. Thus, there is provided a closed system which may employ nitrogen or alcohol, or other proper vapor tension material depending upon the temperatures to which the system is to be responsive. The Bourdon tube may carry a pointer 288 movable relative to an index 291 so that there will be a visual indication, or record of temperature. Upon departure of the steam temperature from the predetermined value the movable end of the Bourdon tube carrying the pointer 288 will actuate the pilot valve through the connections with the stem 258 of the latter, positioning the lands, or elements 260 and 262 of the pilot valve accordingly.

The control of superheat from rating or steam flow, may be effected through the inter-position of the flow meter 290 which may be connected across an orifice or flow nozzle in the steam discharge line, or may use the difference between saturated steam pressure and superheater outlet pressure as a measure of steam flow, there being a parabolic relation between the pressure drop through the superheater and the rate of flow, which is the same law as governs for an orifice or flow nozzle. In the present instance, the flow meter 290 includes an upper chamber which communicates with the superheater outlet header 292 through the tube 294, and a lower floating chamber 296 connected by means of the tubes 298 with the boiler drum 300. The floating chamber 296 actuates a lever 302 which may carry a pointer 304 operable along an index 306. This lever is preferably pivoted intermediate its ends at 308 and pivotally connected by means 278 with a floating link 276.

In the system illustrated in Fig. 28 of the drawings, the diaphragm actuators 310 and 312 may be spring loaded to different pressures. For instance, the actuator 310 may be spring loaded to begin to operate at the pressure of 15 lb. per sq. in. in the line 314, whereas the actuator 312 may be loaded to begin to operate at a pressure of 30 lb. per sq. in. This latter actuator is connected by lines 316 and 318 with a pilot valve 320 which has lands 322 which cause such a relationship between the axial movement of the pilot valve stem 324 and the characteristics of the diaphragm actuators that the actuator 310 may be operated considerably in advance of the operation of the actuator 312, and, in fact, small changes in superheat may involve no operation whatever of the latter actuator. Aside from these respects, the control system indicated in Fig. 28 includes temperature and rating control devices which are similar to those indicated in Fig. 27, and believe that no further detailed description is here necessary.

Fig. 1 of the drawings shows the superheater as receiving its steam from a steam and water drum 330 through the tubes 332. The latter may be expanded at their outlet ends into a superheater header 334, mounted beneath suitable supports in a position preferably exteriorly of the downtake headers 336 and 338 and the nipples 340 connecting them. In the boiler here shown, the coils of the superheater 10 receive their steam through inlet tubes 342 which communicate with the header 334 as shown. They preferably extend along a baffle 344 in such a position that they are exposed to the gases passing from the furnace 346 and across the bank of steam generating tubes 348. After passing through the coils of the superheater the steam emerges through the outlet tubes 350 into an outlet header 352 which is supported by brackets 354 secured at their inner ends to the headers 40 or other suitable means, and maintained at their outer ends by the tension members 356. The latter are shown as secured to brackets 358 preferably welded to the headers 42. The headers 40 and 42 are connected by nipples 360 and the uptake is completed by horizontal circulators 362 and 364. The horizontal circulators 362 connect the sides of the upper ends of the headers 42 directly to the drum 330 and the upper horizontal circulators are shown as extending directly out of the upper ends of the headers 42 and leading directly to the steam space of the drum 330.

The boiler shown is suspended from beams 366, the headers 42 being shown as connected to one of these beams by the tension members 368 and the upper bank of steam generating tubes being partially supported by tension members 370 connected to another one of the beams. This tension member may be secured to bars or plates 371 which pass between the tubes of the upper bank so as to distribute the load on the tension members 370 and maintain the tubes of the upper bank in their operative positions.

Adjacent the bars or plates 371 an extension baffle 374 forms a continuation of the tapering first gas pass in which the superheater 10 is located. This baffle may consist of finger bars or plates which are inserted between the tubes and then turn to become inter-locked with the tubes so that the load of the superheater is distributed over the tubes of the upper bank, when the superheater is supported from this baffle or from tubes of the upper bank.

The boiler circulation is completed through nipples 376 which extend downwardly from the drum 330 and directly connect the drum with the tops of the header 338. These nipples are shown as arranged in a single row throughout the major portions of their lengths but the upper ends of alternate nipples are bent out of their row formation as indicated at 378 in order to provide for adequate ligament strength between the tube seats for the nipples. If desired, the alternate nipples may be bent out of the single row formation at a lower position in order to decrease draft loss.

Fig. 1 shows the furnace 346 to have walls including water tubes 384 and 386 connected respectively at their upper ends to headers 388 and 390. Similar headers may be located in a well known manner in the lower portions of these walls, and be connected to the wall tubes in a manner similar to that shown in connection with the upper headers. When the wall tubes are connected into the boiler circulation, connections such as those shown at 392 and 394 may be employed. The latter are shown as directly connecting the header 338 and the drum 330.

What is claimed is:

1. In a superheater, a bank of spaced tubes, metallic constructions connecting successive tubes so that the tubes are suspended thereby and permitted to move relative to each other under the influence of a wide range of temperature variation, and additional metallic elements welded to the tubes and extending at right angles to said constructions to maintain the horizontal spacing of the tubes and permit adjacent tubes in horizontal succession to move relative to each other, said additional elements having sliding engagement with said constructions.

2. In a superheater, a tube bank formed by the series connected tubes of flat coils swept externally by a heating fluid, the corresponding tubes of adjacent coils being so spaced that vertical movement of alternate coils will effect changes in the tube spacing and will vary the rate of heat transfer, fixed fluid chambers communicating with the inlet and outlet ends of all of the coils, means providing for the flow of steam through the coils, means maintaining the flat coils in parallel vertical planes, and means for vertically moving alternate coils relative to the remaining coils while confining the movement of the alternate coils to their vertical planes, said last named means operating to control superheat by varying the mass flow of the heating gases over the superheater tubes under like conditions of total gas flow over the bank.

3. In fluid heat exchange apparatus, a bank of tubes extending across a gas pass with the tubes so spaced that a change in their spacing will vary the gas mass flow over the tubes and affect the heat transfer rate of the apparatus, a hollow cam shaft, means for suspending some of the rows of tubes from the cam shaft by concentric elements whereby the positions of those rows do not change as the cam shaft is operated, means for suspending others of the rows of tubes from the cam shaft by eccentrically mounted elements so that their positions relative to the first mentioned rows change as the cam shaft is operated and the mass flow over the tubes is accordingly controlled to maintain a constant heating effect, means for circulating a cooling fluid through the cam shaft, and means responsive to rating variations and changes in total heat for operating the cam shaft.

4. In fluid heat exchange apparatus, a bank of spaced tubes extending across a flow of gases, said bank consisting of coils of series connected tube sections supported in parallelism, a cam shaft from which the coils are supported, elements concentric with the cam shaft for supporting the coils of one set, elements eccentric to the cam shaft for supporting the coils of a second set, and means for turning the cam shaft to move the coils of the second set relative to the coils of the first set.

5. In fluid heat exchange apparatus, a bank of spaced tubes extending across a gas flow, said bank consisting of series connected tube sections forming flat coils, a unitary support for the coils in parallelism, spaced and separate support elements secured to the support and so formed and associated with the separate coils that some of the coils remain in their fixed positions while the remainder are moved when the support is turned, and means operable from a position externally of the apparatus for turning the support.

6. In fluid heat exchange apparatus, a bank of tubes formed by horizontally extending tubular sections serially connected to constitute laterally adjacent flat coils arranged in parallel upright relationship, means providing for the passage of a heat exchange fluid externally of the tubular sections while fluid at another temperature flows through the sections, separate tension elements between the sections of the coils for maintaining the tubular sections in a predetermined spaced relationship, and separate and relatively movable supports for the separate coils whereby some of the coils may be shifted with reference to the remainder to change the spacing of the tubular sections of the bank and correspondingly control the heat exchange, said supports being connected with upper tubular sections of the coils at opposite ends of said sections and the tube bank.

WILLIAM T. MOORE.
PERRY R. CASSIDY.
RALPH M. HARDGROVE.
HOWARD J. KERR.